US012281797B2

(12) United States Patent
Crawford et al.

(10) Patent No.: US 12,281,797 B2
(45) Date of Patent: Apr. 22, 2025

(54) HINGE ASSEMBLY FOR AN APPLIANCE DOOR

(71) Applicant: WHIRLPOOL CORPORATION, Benton Harbor, MI (US)

(72) Inventors: Randall Vernen Crawford, St. Joseph, MI (US); Kevin Dolezan, Stevensville, MI (US); Joseph E. Rendzikowski, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 395 days.

(21) Appl. No.: 17/166,281

(22) Filed: Feb. 3, 2021

(65) Prior Publication Data

US 2021/0262672 A1 Aug. 26, 2021

Related U.S. Application Data

(60) Provisional application No. 62/981,196, filed on Feb. 25, 2020.

(51) Int. Cl.
*E05F 1/06* (2006.01)
*E05D 7/00* (2006.01)
*F24C 15/02* (2006.01)

(52) U.S. Cl.
CPC ............ *F24C 15/023* (2013.01); *E05D 7/009* (2013.01); *E05F 1/063* (2013.01); *E05Y 2600/622* (2013.01); *E05Y 2900/308* (2013.01)

(58) Field of Classification Search
CPC ..... E05F 1/02; E05F 1/04; E05F 1/043; E05F 1/06; E05F 1/061; E05F 1/063;
(Continued)

(56) References Cited

U.S. PATENT DOCUMENTS 641,397 A * 1/1900 Liedgens ................ E05F 1/063 16/318
749,379 A * 1/1904 Hartman ................ E05F 1/063 16/318
(Continued)

FOREIGN PATENT DOCUMENTS

CN 105604430 A * 5/2016
DE 3303801 A1 8/1984
(Continued)

OTHER PUBLICATIONS

English translation of Xie (Year: 2016).*
English translation of KR 102195332 Han (Year: 2020).*

*Primary Examiner* — Emily M Morgan
(74) *Attorney, Agent, or Firm* — Price Heneveld LLP

(57) ABSTRACT

A hinge assembly includes a first hinge element having a hinge pin with upper and lower portions and an engagement portion outwardly extending from the hinge pin. The engagement portion of the first hinge element includes a lower surface having an upwardly angled portion and an abutment surface. A second hinge element includes a body portion surrounding a hollow interior portion and further includes a contoured upper rim having a downwardly angled portion and an abutment surface. The lower portion of the hinge pin of the first hinge element is slideably received in the hollow interior portion of the second hinge element. The first hinge element rotates between a first position, wherein the abutment surface of the first hinge element abuts the abutment surface of the second hinge element, and a second position, wherein the abutment surfaces of the first and second hinge elements are spaced-apart from one another.

12 Claims, 8 Drawing Sheets

(58) Field of Classification Search

CPC ........... E05Y 2900/30; E05Y 2900/302; E05Y 2900/308; E05D 3/02; E05D 3/08; E05D 7/009; E05D 7/081; E05D 3/12; E05D 3/06; F24C 15/023

USPC ............................................................ 16/309

See application file for complete search history.

(56) References Cited

U.S. PATENT DOCUMENTS

| | | | | | |
|---|---|---|---|---|---|
| 785,142 | A * | 3/1905 | Winter | E05F 1/063 16/318 |
| 2,180,552 | A | 11/1939 | Schroeder et al. | |
| 2,709,276 | A | 5/1955 | Stein | |
| 3,722,031 | A * | 3/1973 | Bourgeois | E05F 1/063 16/317 |
| 4,215,449 | A * | 8/1980 | Loikitz | E05F 1/1223 16/303 |
| 4,646,472 | A * | 3/1987 | Sugawara | E05F 1/123 16/75 |
| 4,864,691 | A * | 9/1989 | Gidseg | E05D 3/04 312/138.1 |
| 5,881,431 | A | 3/1999 | Pieper, II et al. | |
| 7,000,289 | B2 | 2/2006 | Cedrone | |
| 7,013,531 | B2 | 3/2006 | Jackson | |
| 7,814,897 | B2 | 10/2010 | Larsen | |
| 8,336,535 | B2 | 12/2012 | Larsen et al. | |
| 8,505,166 | B2 * | 8/2013 | Mitchell | E05F 1/066 16/315 |
| 9,140,045 | B1 | 9/2015 | Finkelstein et al. | |
| 9,372,001 | B2 | 6/2016 | Gayle et al. | |
| 9,435,103 | B2 | 9/2016 | Lee | |
| 9,534,433 | B2 | 1/2017 | Elkasevic et al. | |
| 9,631,819 | B2 | 4/2017 | Gayle et al. | |
| 9,677,310 | B1 | 6/2017 | Russo et al. | |
| 2004/0093689 | A1 | 5/2004 | Sosa et al. | |
| 2005/0246863 | A1 | 11/2005 | Chesworth et al. | |
| 2008/0276424 | A1 * | 11/2008 | Gunderson | E05F 1/063 16/286 |
| 2010/0313482 | A1 * | 12/2010 | Minegishi | E05D 7/081 49/386 |
| 2016/0312952 | A1 * | 10/2016 | Kalis | E05D 7/009 |
| 2019/0048633 | A1 * | 2/2019 | Rauth | E05D 11/06 |
| 2019/0330899 | A1 * | 10/2019 | Shinmura | E05F 3/08 |
| 2019/0330900 | A1 * | 10/2019 | Shinmura | E05F 1/1223 |

FOREIGN PATENT DOCUMENTS

| | | | | |
|---|---|---|---|---|
| DE | 3638384 | A1 * | 5/1988 | |
| DE | 202004003997 | U1 | 7/2004 | |
| DE | 102018110763 | A1 | 11/2019 | |
| EP | 0777027 | A1 * | 6/1997 | |
| GB | 635965 | A | 4/1941 | |
| GB | 2356894 | A * | 6/2001 | F24C 15/023 |
| KR | 200391489 | Y1 * | 8/2005 | |
| KR | 102195332 | B1 * | 12/2020 | |
| WO | WO-2017093956 | A1 * | 6/2017 | E05D 11/1014 |

* cited by examiner

HINGE ASSEMBLY FOR AN APPLIANCE DOOR

CROSS-REFERENCE TO RELATED APPLICATION

This application claims priority to and the benefit under 35 U.S.C. § 119 (e) of U.S. Provisional Patent Application No. 62/981,196 filed on Feb. 25, 2020, entitled HINGE ASSEMBLY FOR AN APPLIANCE DOOR, the entire disclosure of which is hereby incorporated herein by reference.

BACKGROUND OF THE DISCLOSURE

The present disclosure generally relates to a hinge assembly, and more specifically, to a hinge assembly for an appliance door.

SUMMARY OF THE DISCLOSURE

According to one aspect of the present disclosure, an appliance includes a housing defining a cooking cavity with an open front portion. A door is pivotally coupled to the housing along a vertical rotational axis between open and closed positions relative to the open front portion of the cooking cavity to selectively provide access to the cooking cavity. A hinge assembly interconnects the door and the housing, and includes a first hinge element having a hinge pin with upper and lower portions and an engagement portion disposed therebetween. The engagement portion includes a lower surface with at least one vertically disposed abutment surface. The hinge assembly further includes a second hinge element having a body portion surrounding a hollow interior portion which slidably receives the lower portion of the hinge pin of the first hinge element. The second hinge element further includes a contoured upper rim having at least one vertically disposed abutment surface. The contoured upper rim of the second hinge element is engaged with the lower surface of the first hinge element. The first hinge element rotates relative to the second hinge element between a first position, wherein the at least one abutment surface of the first hinge element abuts the at least one abutment surface of the second hinge element, and a second position, wherein the at least one abutment surface of the first hinge element is horizontally and vertically spaced-apart from the at least one abutment surface of the second hinge element.

According to another aspect of the present disclosure, a hinge assembly for pivotally coupling a door to an appliance includes a first hinge element having a hinge pin with upper and lower portions and an engagement portion outwardly extending from an outer surface of the hinge pin. The engagement portion of the first hinge element includes a lower surface having an upwardly angled portion disposed adjacent to an abutment surface. A second hinge element includes a body portion surrounding a hollow interior portion and further includes a contoured upper rim having a downwardly angled portion and an abutment surface. The lower portion of the hinge pin of the first hinge element is slideably received in the hollow interior portion of the second hinge element for vertical movement therein. The first hinge element rotates relative to the second hinge element between a first position, wherein the abutment surface of the first hinge element abuts the abutment surface of the second hinge element, and a second position, wherein the abutment surface of the first hinge element is spaced-apart from the abutment surface of the second hinge element.

According to one aspect of the present disclosure, an appliance includes a cooking cavity with an open front portion and a door operable between open and closed positions relative to the open front portion of the cooking cavity to selectively provide access to the cooking cavity. A hinge assembly includes a first hinge element operably coupled to the door for rotation therewith. The first hinge element includes an engagement portion having a lower surface and an abutment surface. The hinge assembly further includes a second hinge element having an upper rim engaged with the lower surface of the engagement portion of the first hinge element. The upper rim of the second hinge element includes an angled portion and an abutment surface. The first hinge element rotates relative to the second hinge element between a first rotational position, wherein the abutment surface of the first hinge element abuts the abutment surface of the second hinge element and the door is in the open position, and a second rotational position, wherein the abutment surface of the first hinge element is spaced-apart from the abutment surface of the second hinge element and the door is in the closed position.

These and other features, advantages, and objects of the present disclosure will be further understood and appreciated by those skilled in the art by reference to the following specification, claims, and appended drawings.

Figure 1:
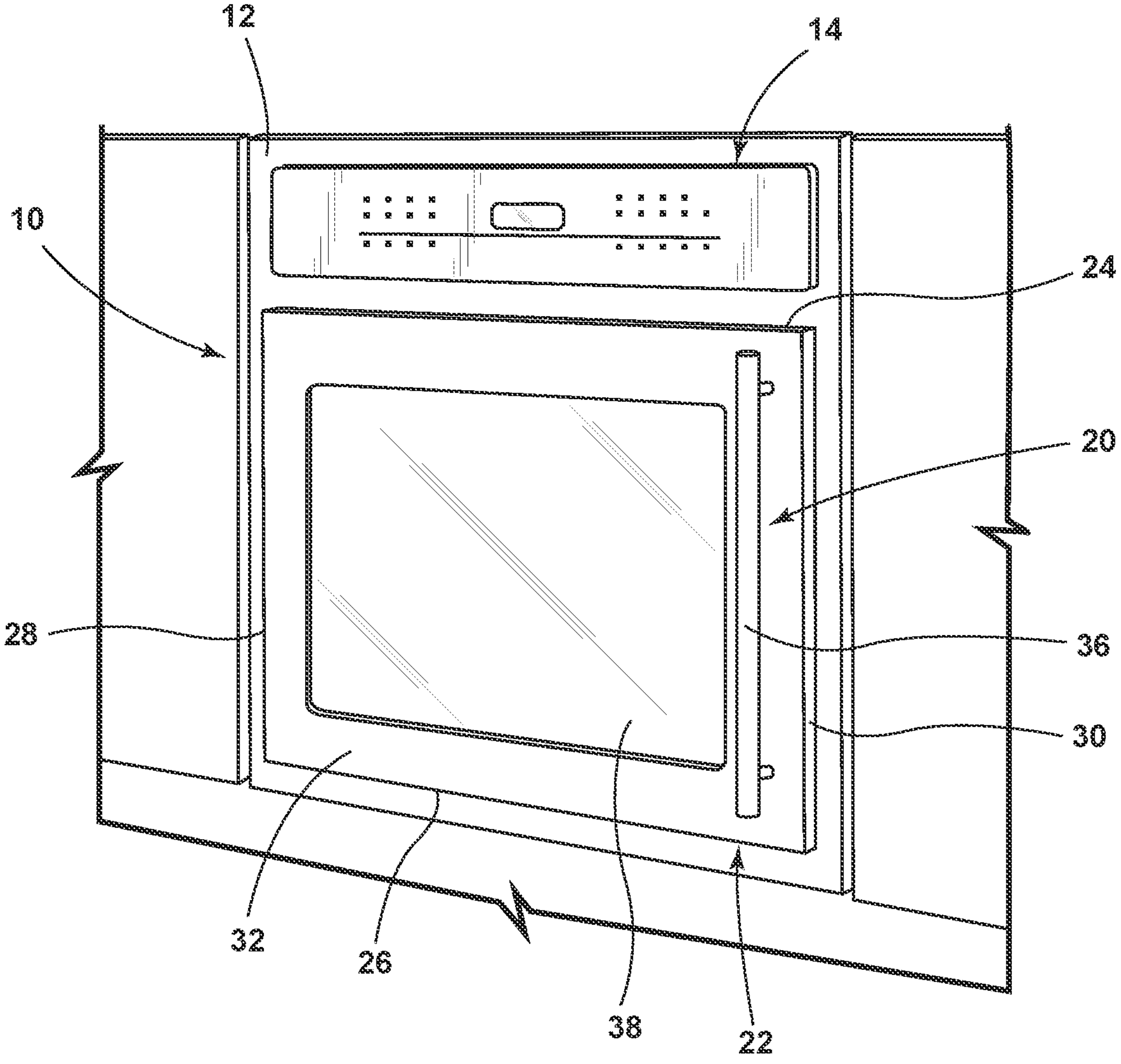
FIG. 1 is a top perspective view of an appliance have a door shown in a closed position.

The components in the figures are not necessarily to scale, emphasis instead being placed upon illustrating the principles described herein.

DETAILED DESCRIPTION

The present illustrated embodiments reside primarily in combinations of method steps and apparatus components related to a hinge assembly for an appliance door. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
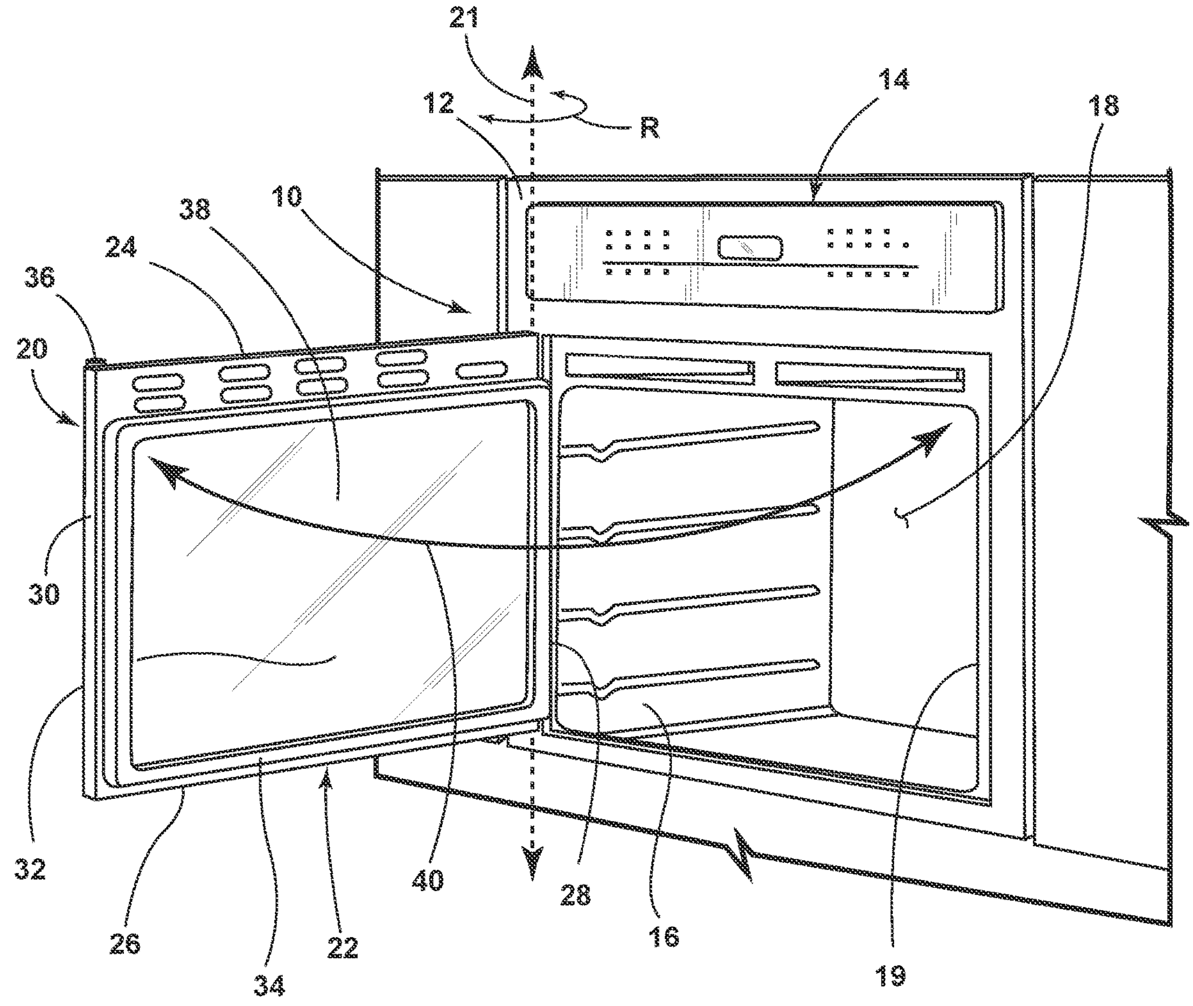
FIG. 2 is a top perspective view of the appliance of FIG. 1 showing the door in an open position and illustrating relative movement of the same.

Referring now to FIGS. 1 and 2, the reference numeral 10 generally designates an appliance. In FIGS. 1 and 2, the appliance 10 is shown in the form of a built-in oven, but may also include a range having an oven portion, a microwave oven, a toaster oven, a refrigerator or a laundry care appliance, such as a front loading washer or dryer. The appliance 10 includes a front panel 12 having a control panel assembly 14 positioned above a door 20. The door 20 is pivotally coupled to the front panel 12 or a housing 16 of the appliance 10. The housing 16 defines a cooking cavity 18 having an open front portion 19. The door 20 is operable between open and closed positions (FIGS. 2 and 1, respectively) with respect to the open front portion 19 of the cooking cavity 18. In this way, the door 20 selectively provides access to the cooking cavity 18. As specifically shown in FIG. 2, the door 20 is pivotally coupled to the appliance 10 on a vertical axis 21 for rotational movement in the direction as indicated by arrow R between the open and closed positions. In this way, the door 20 is a side swing door for the appliance 10.

As further shown in FIGS. 1 and 2, the door 20 includes a door panel 22 having upper and lower sides 24, 26 that are spaced-apart from one another and interconnected by first and second sides 28, 30. With specific reference to FIG. 1, the door panel 22 includes a front side 32 having a handle 36 coupled thereto. In the embodiment shown in FIGS. 1 and 2, the handle 36 is disposed adjacent to the second side 30 of the door panel 22 and is contemplated to be engaged by a user for opening and closing the door 20. Other locations for the handle 36 on the door 20 are contemplated without departing from the spirit of the present invention. The door panel 22 shown in the embodiment of FIGS. 1 and 2 further includes a viewing pain 38 that is generally centrally disposed on the door panel 22. With specific reference to FIG. 2, the door panel 22 further includes a rear side 34. As further shown in FIG. 2, the door panel 22 is shown as being coupled to the front panel 12 of the appliance 10 adjacent the first side 28 of the door panel 22. As such, it is contemplated that the door 20 pivots at or near the first side 28 of the door panel 22 along the rotational path R defined by the vertical pivot access 21, while the second side 30 of the door panel 22 moves along the rotational path 40 to define a swing path of the door 20. The rotational path 40 shown in FIG. 2 is an exemplary embodiment of a swing path for the door 20, and other swing paths, such as a reverse swing path wherein the door 20 pivots from the second side 30 of the door panel 20, are contemplated for use with the present concept.

Figure 3:
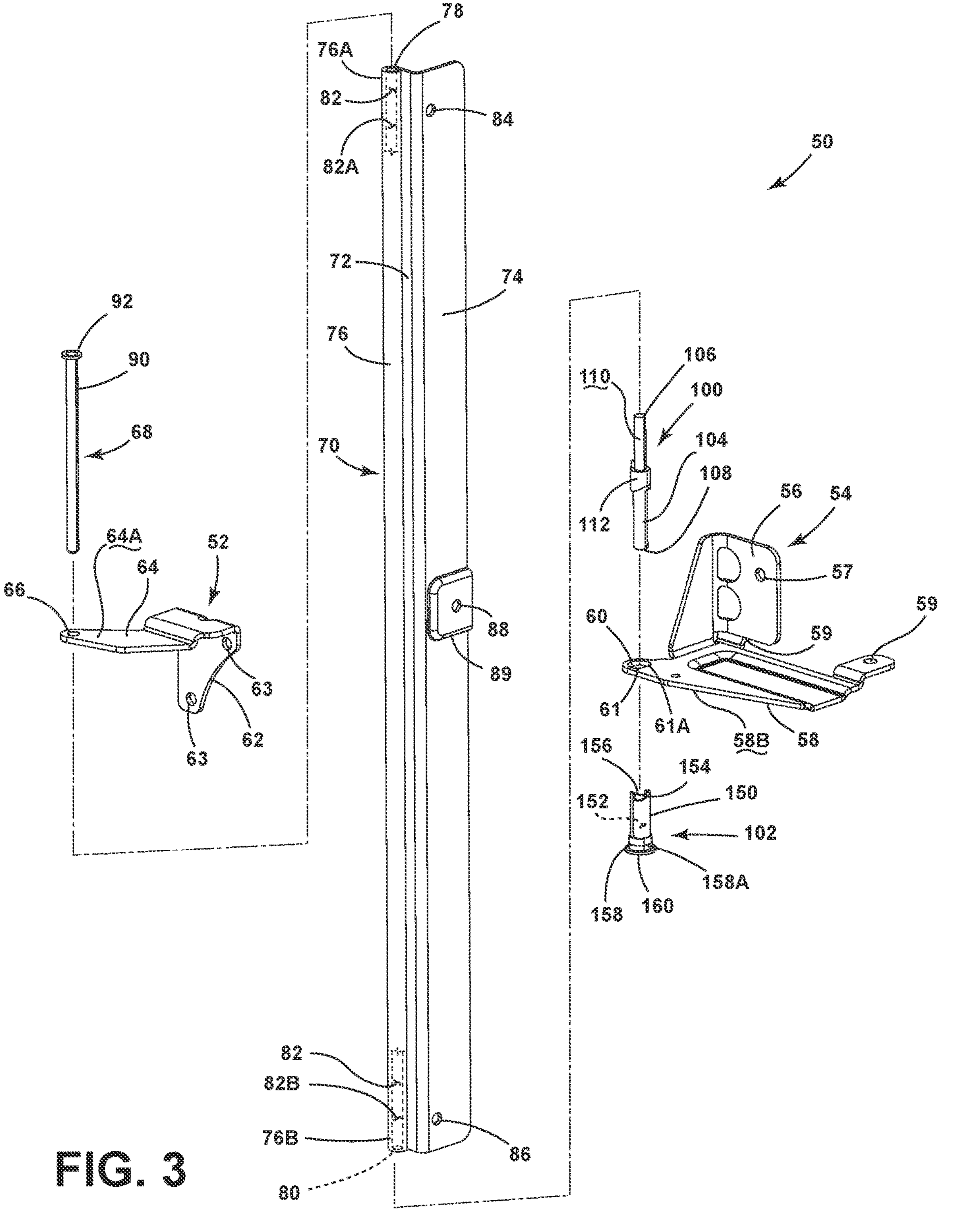
FIG. 3 is an exploded top perspective view of a hinge assembly.

Referring now to FIG. 3, an exploded perspective view of a hinge assembly 50 is shown. The hinge assembly 50 is contemplated to interconnect the door 20 with the front panel 12 or the housing 16 of the appliance 10. It is contemplated that the door 20 can be mounted to either the front panel 12 or the housing 16 of the appliance 10 without departing from the spirit of the present concept. As shown in FIG. 3, the hinge assembly 50 includes upper and lower hinge brackets 52, 54 that are spaced-apart from one another. The lower hinge bracket 54 includes a first mounting portion 56 having one or more mounting apertures 57 that are used to mount the lower hinge bracket 54 to the front panel 12 or housing 16 of the appliance 10 using a fasteners. The lower hinge bracket 54 further includes a second mounting portion 58 having first and second mounting tabs 59 that are used to mount the lower hinge bracket 54 to the housing 16 of the appliance 10. The first and second mounting portions 56, 58 are contemplated to be integrated parts disposed on transverse planes for coupling to transverse surfaces of the housing 16 or front panel 12 of the appliance 10. The second mounting portion 58 of the lower hinge bracket 54 outwardly extends from the first mounting portion 56. The second mounting portion 58 includes a receiving aperture 60 that is configured to receive a second hinge element 102, as further described below. The receiving aperture 60 includes a substantially round outer perimeter 61 having a flat portion 61A. The upper hinge bracket 52 includes a first mounting portion 62 having one or more mounting apertures 63 that are used to mount the upper hinge bracket 52 to the front panel 12 or housing 16 of the appliance 10. The upper hinge bracket 52 further a second mounting portion 64 that outwardly extends from the first mounting portion 62 and which includes a receiving aperture 66 for receiving an upper hinge pin 68, as further described below. Much like the lower hinge bracket 54, first mounting portion 62 and the second mounting portion 64 of the upper hinge bracket 52 are disposed in transverse planes relative to one another.

Figure 6:
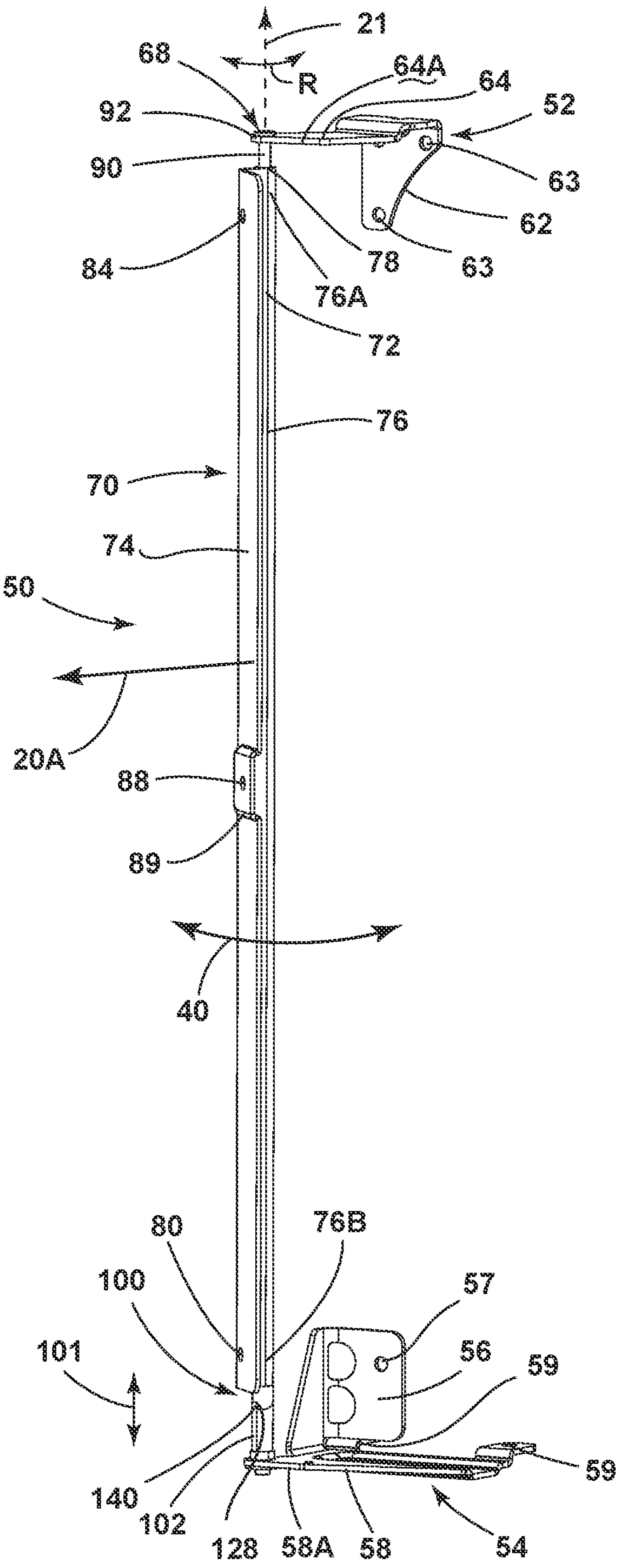
FIG. 6 is a top perspective view of the hinge assembly of FIG. 3 in an assembled condition with a mounting plate shown in a first position.
Figure 7:
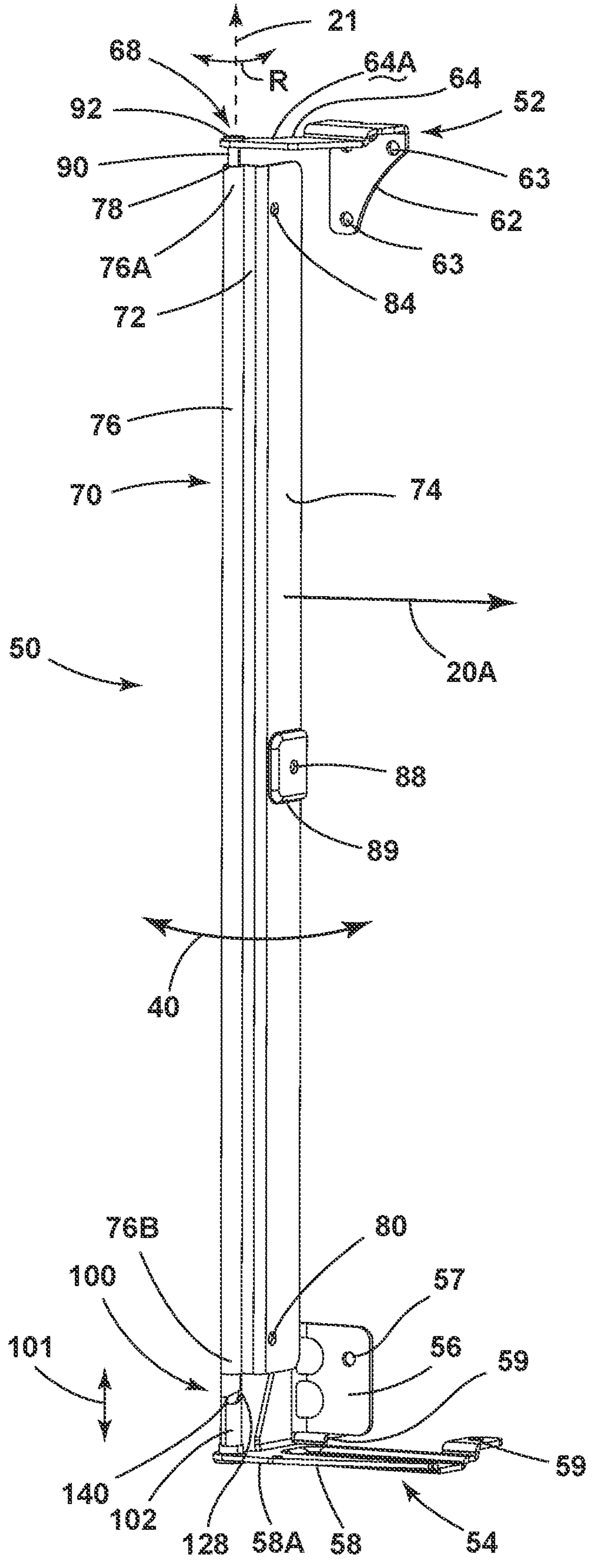
FIG. 7 is a top perspective view of the hinge assembly of FIG. 6 with the mounting plate shown in a second position.

With further reference to FIG. 3, the hinge assembly 50 includes a mounting plate 70 operable between first and second positions, as further described below. The mounting plate 70 includes a first portion 72 and a second portion 74. In the embodiment shown in FIG. 3, the first portion 72 is disposed at an approximately right angle relative to the second portion 74. The first portion 72 includes a mounting sleeve 76 which includes an upper aperture 78 and a lower aperture 80 disposed at opposed first and second sides 76A, 76B of the mounting sleeve 76. The upper and lower apertures 78, 80 of the mounting sleeve 76 open into a hollow interior portion 82 of the mounting sleeve 76. The hollow interior portion 82 of the mounting sleeve 76 may extend between the upper and lower apertures 78, 80, to cover an entire length of the mounting sleeve 76, or the mounting sleeve 76 may include upper and lower portions 82A, 82B that are partially bored out portions. The upper aperture 78 is configured to receive a shaft portion 90 of the upper hinge pin 68. The upper hinge pin 68 further includes a head portion 92 that is configured to abut an upper surface 64A of the upper hinge bracket 52 as the shaft portion 90 is received in the receiving aperture 66 of the second mounting portion 64 of the upper hinge bracket 52. This arrangement is best shown in FIGS. 6 and 7. The mounting plate 70 further includes upper and lower mounting apertures 84, 86 disposed through the second portion 74 of the mounting plate 70. An intermediate mounting aperture 88 is positioned on an outwardly extending mounting block 89 on the second portion 74 of the mounting plate 70. The mounting apertures 84, 86 and 88 are used to couple the mounting plate 70 to the door 20 of the appliance 10. Thus, as the mounting plate 70 rotates between first and second positions, as further described below, the door 20 rotates between the open and closed positions shown in FIGS. 1 and 2.

Figure 9A:
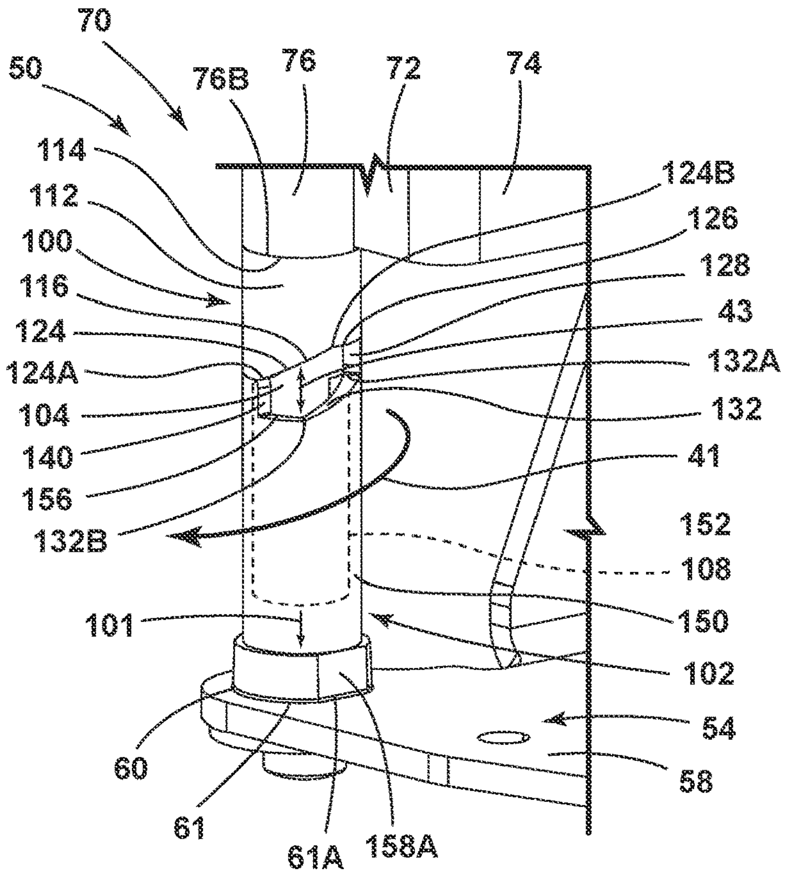
FIG. 9A is a fragmentary top perspective view of the hinge assembly of FIG. 6 with the first hinge element shown in a second rotational position and a second vertical position.
Figure 9B:
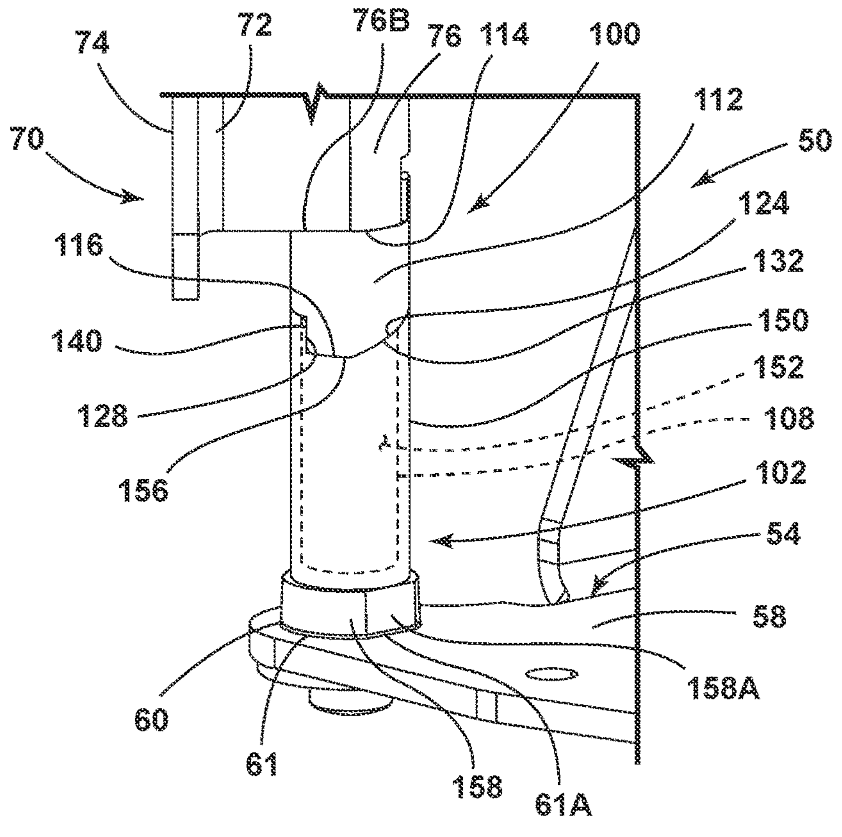
FIG. 9B is a fragmentary top perspective view of the hinge assembly of FIG. 9A with the first hinge element shown in a first rotational position and a first vertical position.

With further reference to FIG. 3, the lower hinge bracket 54 is shown having a first hinge element 100 spaced away from the second hinge element 102. The first hinge element 100 generally defines a hinge pin 104 having a substantially cylinder-shaped configuration with upper and lower portions 106, 108. An engagement portion 112 includes a generally barrel shaped configuration that extends outwardly from an outer surface 110 of the hinge pin 104. The engagement portion 112 is disposed between the upper and lower portions 106, 108 of the hinge pin 104. The first hinge element 100 is further described below with specific reference to FIGS. 4A and 4B. The second hinge element 102 is shown exploded away from the receiving aperture 60 of the lower hinge bracket 54. The second hinge element 102 includes a generally cylinder-shaped body portion 150 surrounding a hollow interior portion 152 and an open top portion 154 generally defined by a contoured upper rim 156 that opens into the hollow interior portion 152. The second hinge element 102 further includes a base portion 158 having a substantially round configuration with a flat portion 158A. In assembly, the base portion 158 is received in the receiving aperture 60 of the lower hinge bracket 54, such that the flat portion 61A of the receiving aperture 60 aligns with the flat portion 158A of the base portion 158, such that the second hinge element 102 is rotationally fixed with respect to the lower hinge bracket 54, as best shown in FIGS. 9A and 9B. The second hinge element 102 further includes a head portion 160 that is configured to abut a lower surface 58B of the second mounting portion 58 of the lower hinge bracket 54. The second hinge element 102 is further described below with reference to FIG. 5. In assembly, the lower portion 108 of the hinge pin 104 of the first hinge element 100 is slidably received within the hollow interior portion 152 of the second hinge element 102. In this way, the first hinge element 100 can rotate with respect to the second hinge element 102, and can move vertically with respect to the second hinge element 102, as further described below.

Figure 4A:
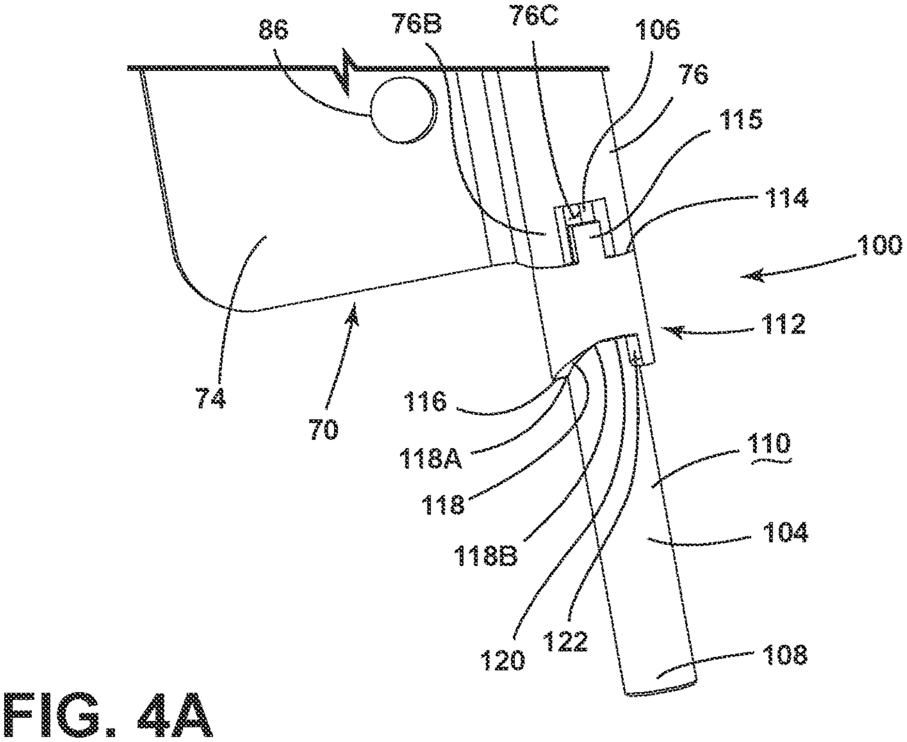
FIG. 4A is a top perspective view of a first hinge element.

Referring now to FIG. 4A, the engagement portion 112 of the first hinge element 100 includes upper and lower surfaces 114, 116. The upper surface 114 includes an engagement feature 115 upwardly extending from the upper surface 114. As shown in FIG. 4A, the upwardly extending engagement feature 115 is received in a slot 76C that opens upwardly into the mounting sleeve 76 of the mounting plate 70. In this way, rotation of the mounting plate 70 results in rotation of the first hinge element 100 by the engagement of the engagement feature 115 of the first hinge element 100 with the slot 76C of the mounting plate 70. Thus, as a result of this engagement, the mounting plate 70 and the first hinge element 100 are rotationally fixed with respect to one another. The upper surface 114 of the engagement portion 112 is a generally flat surface, with the exception of the engagement feature 115, that generally abuts the second side 76B of the mounting sleeve 76 of the mounting plate 70 in assembly.

Figure 4B:
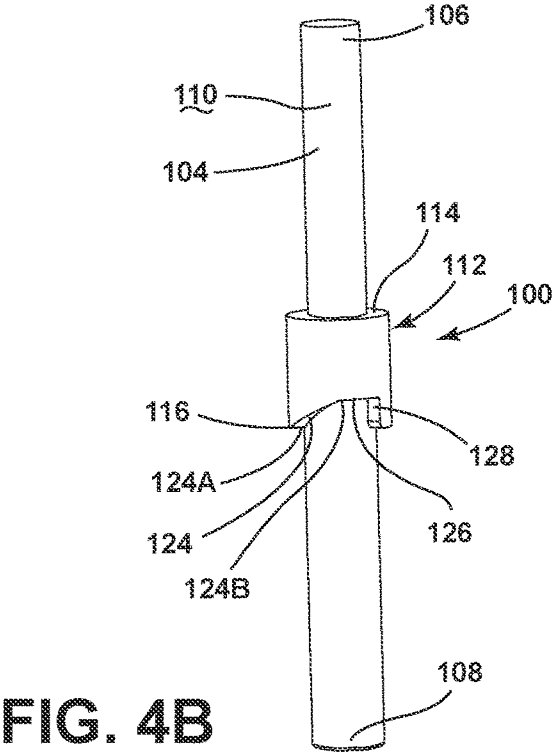
FIG. 4B is a top perspective view of the first hinge element of FIG. 4A.

As further shown in FIG. 4A, the lower surface 116 of the engagement portion 112 of the first hinge element 100 is a contoured lower surface having multiple angled portions 118 (FIG. 4A) and 124 (FIG. 4B). The angled portion 118 defines a first angled portion that is disposed on the lower surface 116 of the engagement portion 112 below the upwardly extending engagement feature 115 of the upper surface 114 of the engagement portion 112. The angled portion 118 includes a first end 118A and a second end 118B, such that the angled portion 118 is an upwardly inclined angled portion as viewed from the first end 118A to the second end 118B. Moving from left to right along the lower surface 116 of the engagement portion 112, a substantially flat portion 120 is disposed on the lower surface 116 of the engagement portion 112 directly following the first angled portion 118. An abutment surface 122 is substantially positioned in a vertical position following the substantially flat portion 120 on the lower surface 116. The abutment surface 122 defines a first abutment surface of the lower surface 116 of the engagement portion 112 of the first hinge element 100.

Referring now to FIG. 4B, the angled portion 124 is shown and defines a second angled portion that is disposed on the lower surface 116 of the engagement portion 112. The angled portion 124 includes a first end 124A and a second end 124B, such that the angled portion 124 is an upwardly inclined angled portion as viewed from the first end 124A to the second end 124B. Moving from left to right along the lower surface 116 of the engagement portion 112, a substantially flat portion 126 is disposed on the lower surface 116 of the engagement portion 112 directly following the second angled portion 124. An abutment surface 128 is substantially positioned in a vertical position following the substantially flat portion 126 on the lower surface 116. The abutment surface 128 defines a second abutment surface of the lower surface 116 of the engagement portion 112 of the first hinge element 100. Thus, the engagement portion 112 of the first hinge element 100 includes a contoured lower surface 116 having first and second angled portions 118, 124 that are upwardly angled portions leading towards first and second abutment surfaces 122, 128, respectively. It is contemplated the engagement portion 112 may include a single angled portion on the contoured lower surface 116 thereof, as opposed to the dual angled portion configuration shown in FIGS. 4A and 4B.

Figure 5:
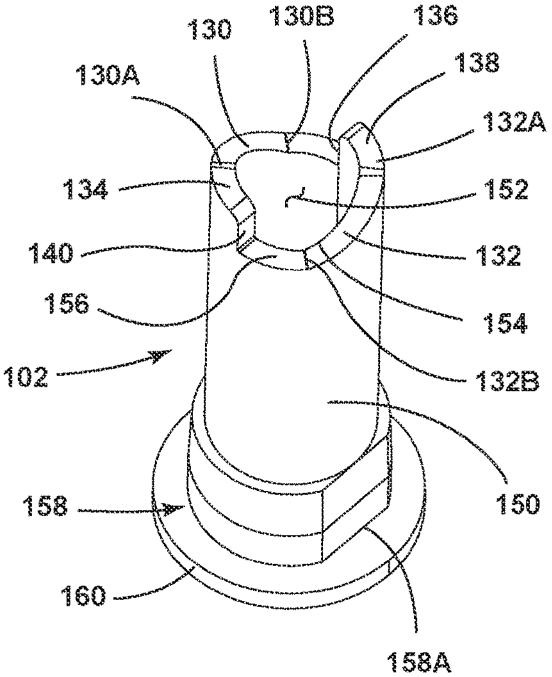
FIG. 5 is a top perspective view of a second hinge element.

Referring now to FIG. 5, the second hinge element 102 includes the body portion 150 extending upwardly from the base portion 158 and culminating in the open top portion 154 which opens into the hollow interior portion 152. As noted above, the open top portion 154 of the second hinge element 102 is surrounded by a contoured upper rim 156. The contoured upper rim 156 includes first and second angled portions 130, 132, which are downwardly angled first and second portions disposed along the contoured upper rim 156. The first angled portion 130 includes a first end 130A and a second end 130B, such that the first angled portion 130 is a downwardly declining angled portion as viewed from the first end 130A to the second end 130B of the first angled portion 130. Moving counterclockwise along the contoured upper rim 156 of the second hinge element 102, a substantially flat portion 134 is disposed adjacent to the first angled portion 130 on the contoured upper rim 156. An abutment surface 140 is substantially positioned in a vertical position following the substantially flat portion 134 on the contoured upper rim 156. The abutment surface 140 defines a second abutment surface of the contoured upper rim 156 of the second hinge element 102.

As further shown in FIG. 5, the second angled portion 132 includes a first end 132A and a second end 132B, such that the second angled portion 132 is a downwardly declining angled portion as viewed from the first end 132A to the second end 132B. Moving counterclockwise along the contoured upper rim 156 of the second hinge element 102, a substantially flat portion 138 is disposed adjacent to the second angled portion 132 on the contoured upper rim 156. An abutment surface 136 is substantially positioned in a vertical position following the substantially flat portion 138 on the contoured upper rim 156. The abutment surface 136 defines a first abutment surface of the contoured upper rim 156 of the second hinge element 102. Thus, the contoured upper rim 156 of the second hinge element 102 includes first and second angled portions 130, 132 that are downwardly angled portions leading towards first and second abutment surfaces 136, 140. It is contemplated the contoured upper rim 156 of the second hinge element 102 may include a single angled portion, as opposed to the dual angled portion configuration shown in FIG. 5. The first and second abutment surfaces 136, 140 are shown as being positioned approximately 180° from one another around the contoured upper rim 156 of the second hinge element 102.

Referring now to FIG. 6, the mounting plate 70 of the hinge assembly 50 is shown as having been rotated along the rotational path 40 to a first position. The first position of the mounting plate 70 correlates to an open position of the door 20, such as shown in FIG. 2. The door 20 is contemplated to extend outwardly from the second portion 74 of the mounting plate 70 in the direction as indicated by arrow 20A. From the first position, the mounting plate 70 can be rotated inwardly along the rotational path as indicated by arrow 42 a second position, as shown in FIG. 7. In moving from the first position to the second position, as shown in FIG. 7, the mounting plate 70 is contemplated to have been driven upward in the direction as indicated by arrow 101. The second position of the mounting plate 70 correlates to a closed position of the door 20, as shown in FIG. 1. The hinge assembly 50 of the present concept is contemplated to be gravitationally biased towards the first position which, as noted above, correlates to an open position of the door 20. In this way, a user will unlatch the door 20 from the appliance 10, and the hinge assembly 50 may allow for the door 20 to automatically open along the rotational path 40 (FIG. 2) from the closed position to the open position, to which the door 20 is biased. With the hinge assembly 50 predisposed towards the mounting plate 70 being in the first position, the door 20 of the appliance 10 can be opened by a user and remain open while the user inserts a food item into the cooking cavity 18 (FIG. 2). In the first position shown in FIG. 6, the second abutment surface 128 of the first hinge element 100 is engaged with the second abutment surface 140 of the second hinge element 102. In this way, the abutment of the second abutment surfaces 128, 140 acts as a door stop feature for the door 20 that can be tuned to ensure that neither the door panel 22, nor the handle 36 thereof (FIG. 1), opens into cabinetry disposed adjacent to the appliance 10 as installed. While not shown in FIG. 6, it is contemplated that the first abutment surface 122 of the first hinge element 100 is also engaged with the first abutment surface 136 of the second hinge element 102, given the dual angled surface configuration and dual abutment surface configuration of both the first and second hinge element 100, 102.

As specifically shown in FIGS. 6 and 7, the pivot axis 21 is defined between the mounting sleeve 76, the upper hinge pin 68 and the engagement between the first and second hinge elements 100, 102. As such, the upper hinge pin 68 and the hinge pin 104 of the first hinge element 100 are axially aligned and centered on the pivot axis 21, such that the second portion 74 of the mounting plate 70 rotates along the rotational path 40 as the mounting plate 70 of the hinge assembly 50 moves between first and second positions. The mounting sleeve 76 pivots along the rotational path R defined by the pivot axis 21 as the mounting sleeve 76 is operably coupled to the upper hinge pin 68 and the hinge pin 104 of the first hinge element 100 at the opposed first and second sides 76A, 76B thereof. Thus, when a user rotates the door 20 from the closed position (FIG. 1) to the open position (FIG. 2), the mounting plate 70 rotates from the second position (FIG. 7) to the first position (FIG. 6) as gravitationally predisposed thereto.

Figure 8A:
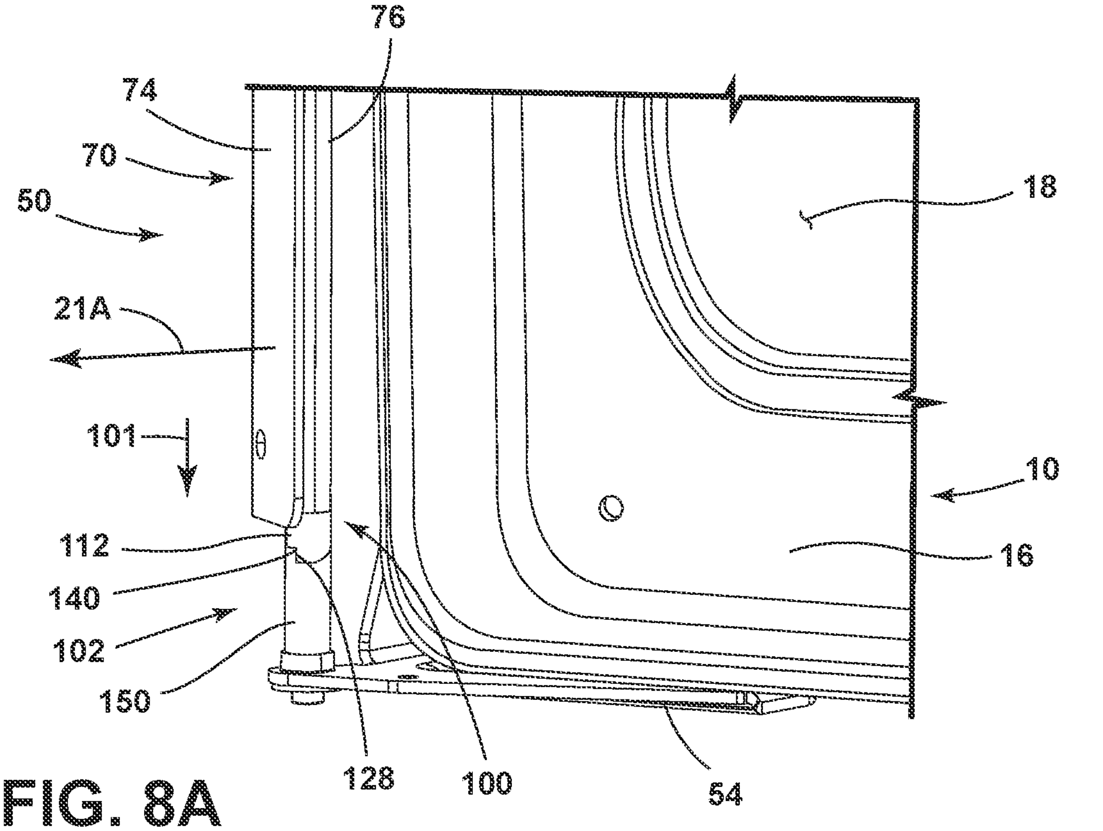
FIG. 8A is a fragmentary top perspective view of the hinge assembly of FIG. 6 coupled to the appliance of FIG. 1, with the mounting plate shown in the first position.

Referring now to FIG. 8A, the lower hinge bracket 54 is shown coupled to the housing 16 of the appliance 10. The mounting plate 70 of the hinge assembly 50 is shown in the first position, which correlates to a first rotational position of the first hinge element 100. Further, as noted above, the first position of the mounting plate 70 relates to an open position of the door 20. In the open position, the respective second abutment surfaces 128, 140 of the first and second hinge elements 100, 102 are shown engaged with one another, by directly abutting one another, to limit the opening movement of the mounting plate 70, as well as door 20 as mounted to the mounting plate 70.

Figure 8B:
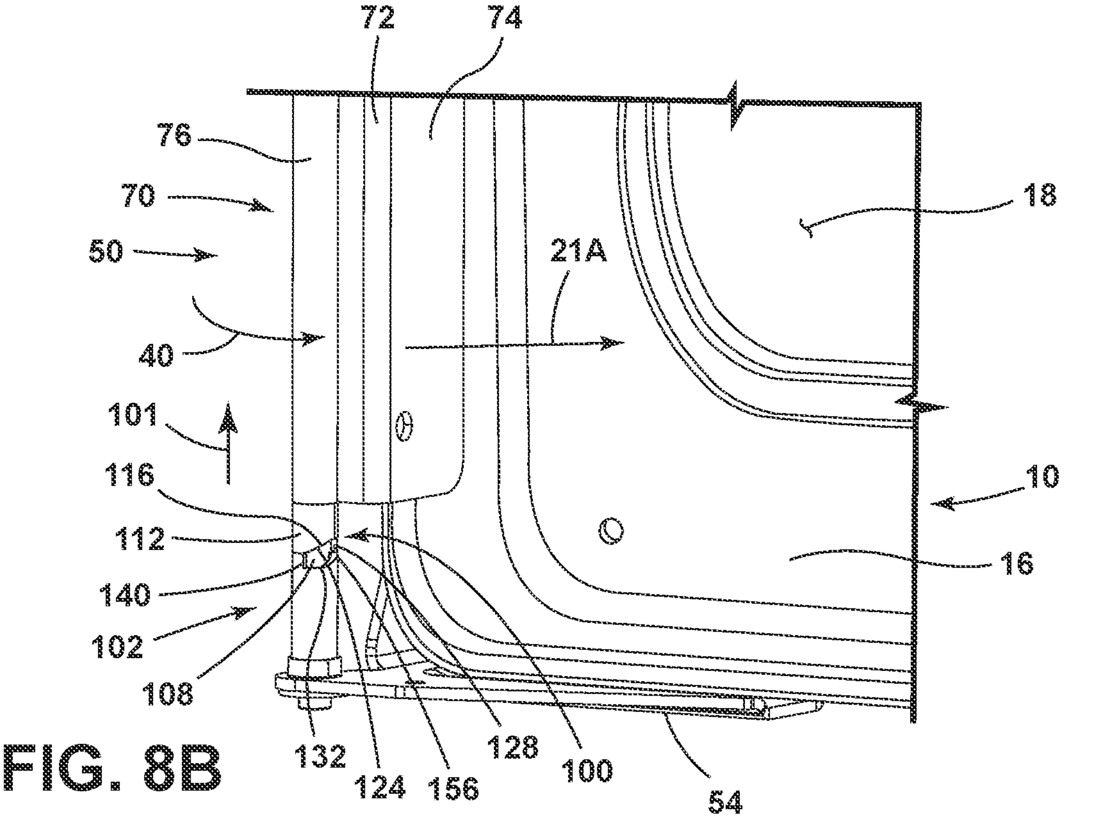
FIG. 8B is a fragmentary top perspective view of the hinge assembly of FIG. 8A with the mounting plate shown in the second position.

Referring now to FIG. 8B, the mounting plate 70 of the hinge assembly 50 has been rotated inwardly along the rotational path 40. The mounting plate 70 is engaged with the first hinge element 100, such that the mounting plate 70 is rotationally fixed with regards to the first hinge element 100 as discussed above with reference to FIG. 4A. As such, rotation of the mounting plate 70 in the inward direction from FIG. 8A to FIG. 8B correlates to an inward rotation of the first hinge element 100 from the first rotational position (FIG. 8A) to a second rotational position (FIG. 8B), relative to the second hinge element 102. As noted above, the second hinge element 102 is contemplated to be rotationally fixed with the lower hinge bracket 54. Thus, as the first hinge element 100 rotates inwardly relative to the second hinge element 102 from the first rotational position (FIG. 8A) to the second rotational position (FIG. 8B), the first hinge element 100 will elevate vertically from a first vertical position (FIG. 8A) to a higher second vertical position (FIG. 8B) as the lower surface 116 of the engagement portion 112 of the first hinge element 100 is engaged with the contoured upper rim 156 of the second hinge element 102. Thus, the lower surface 116 of the engagement portion 112 of the first hinge element 100 rides along the angled portion 132 of the contoured upper rim 156 of the second hinge element 102. Thus, in FIG. 8B, the first hinge element 100 is in the second rotational position, which is contemplated to be a loaded position. The second rotational position of the first hinge element 100 is described as a loaded position in that the first hinge element 100 is ready and predisposed to rotational movement from the second rotational position (FIG. 8B) towards the first rotational position (FIG. 8A), and vertical movement from the second vertical position (FIG. 8B) downward towards the first vertical position (FIG. 8A). Thus, the door 20 (FIG. 1) is contemplated to be retained in the closed position by a latch mechanism against the pre-disposition of the hinge assembly 50. When the door 20 is released from the latch mechanism and the closed position, the lower surface 116 of the engagement portion 112 of the first hinge element 100 will ride along the downwardly inclined angled portion 132 of the contoured upper rim 156 of the second hinge element 102 until the abutment surface 128 of the first hinge element 100 abuts the abutment surface 140 of the second hinge element 102. The movement of the first hinge element 100 along the downwardly inclined angled portion 132 of the contoured upper rim 156 of the second hinge element 102 will move the first hinge element 100 downward in the direction as indicated by arrow 101 (FIG. 8A) between the second vertical position (FIG. 8B) to the first vertical position (FIG. 8A). In this way, it is contemplated that the interconnection between the first hinge element 100 and the second hinge element 102 is gravitationally disposed to the abutting position shown in FIG. 8A, which correlates to the first rotational position and first vertical position of the first hinge element 100, and further correlates to an open position of the door 20. Again, as noted above, dual abutment surfaces and dual angled portions of the first and second hinge elements 100, 102 may be used to limit and guide rotational movement of the door 20 with respect to the appliance 10.

In the embodiment shown in FIG. 8B, the abutment surface 128 of the first hinge element 100 is spaced-apart from the abutment surface 140 of the second hinge element 102 in both a vertical and horizontal manner, in that the abutment surface 128 of the first hinge element 100 is positioned horizontally away from the abutment surface 140 of the second hinge element 102, and above the abutment surface 140 of the second hinge element 102 when the door 20 is in the closed position. Thus, the first hinge element 100 must rotate outwardly from the position shown in FIG. 8B to the rotational position shown in FIG. 8A, and must vertically drop downwardly during this rotation to align the respective abutment surfaces 128, 140 of the first and second hinge element 100, 102.

Referring now to FIG. 9A, the mounting plate 70 and the first hinge element 100 of the hinge assembly 50 are shown rotated inwardly to the respective second positions, which, as noted above, correlates to a closed position for the door 20 (FIG. 1). Thus, the configuration of the hinge assembly 50 in FIG. 9A is akin to the configuration of the hinge assembly in FIG. 8B. The second hinge element 102 is rotationally fixed with the lower hinge bracket 54 with the alignment of flat portion 61A of receiving aperture 60 with the flat portion 158A of the base portion 158 of the second hinge element. As specifically shown in FIG. 9A, portions of the lower surface 116 of the engagement portion 112 of the first hinge element 100 are engaged with the contoured upper rim 156 of the second hinge element 102, while other portions of the lower surface 116 of the engagement portion 112 of the first hinge element 100 are spaced-apart from the contoured upper rim 156 of the second hinge element 102. Specifically, the angled portion 124 of the lower surface 116 of the first hinge element 100 is spaced-apart from the angled portion 132 of the contoured upper rim 156 of the second hinge element 102 to define a gap therebetween as indicated by arrow 43. Further, the abutment surface 128 of the first hinge element 100 is spaced-apart from the abutment surface 140 of the second hinge element 102. The spacing between portions of the lower surface 116 of the first hinge element 100 and the contoured upper rim 156 of the second hinge element 102 is due to the first hinge element 100 being in the second rotational position, and the second vertical position. As noted above, the second vertical position of the first hinge element 100 (FIG. 9A) is a higher vertical position as compared to the first vertical position of the first hinge element 100, shown in FIG. 9B. Thus, the lower portion 108 of the hinge pin 104 of the first hinge element 100 is slidably received within the hollow interior portion 152 of the second hinge element 102. With the predisposition of the first hinge element 100 to the first rotational position and first vertical position, shown in FIG. 9B, the lower portion 108 of the hinge pin 104 of the first hinge element 100 will move downward within the hollow interior portion 152 of the second hinge element 102 in the direction as indicated by arrow 101.

With further reference to FIG. 9A, the first hinge element 100 will move from the second rotational position and second vertical position in the direction as indicated by arrow 41 by a downward and outwardly turning movement of the first hinge element 100. In making this rotational movement, the lower surface 116 of the engagement portion 112 of the first hinge element 100 will ride along the downwardly angled portion 132 of the contoured upper rim 156 of the second hinge element 102 from the first end 132A of the downwardly angled portion 132 of the contoured upper rim 156, to the second end 132B of the downwardly angled portion 132 of the contoured upper rim 156. As noted above, this outward rotation of the first hinge element 100 and the mounting plate 70 correlates to an opening movement of the door 20 along the rotational path 40, as shown in FIG. 2. The predisposed rotational movement of the first hinge element 100 continues until the abutment surface 128 of the first hinge element 100 abuts the abutment surface 140 of the second hinge element 102. Thus, the first hinge element 100 moves downward in the direction as indicated by arrow 101 and rotates outward in the direction as indicated by arrow 41 from the second rotational position and the second vertical position, to the first rotational position and the lower first rotational position, shown in FIG. 9B. With specific reference to FIG. 9B, the abutment surfaces 128, 140 of the first and second hinge elements 100, 102 are engaged with one another in an abutting manner as further shown in FIG. 9B, the lower portion 108 of the hinge pin 104 of the first hinge element 100 has moved downwardly within the hollow interior portion 152 of the second hinge element 102 instead of being spaced-apart the distance indicated by arrow 43 shown in FIG. 9A, the respective angled portions 124, 132 of the lower surface 116 of the first hinge element 100 and the contoured upper rim 156 of the second hinge element 102 are engaged with one another in the first rotational position and first vertical position of the first hinge element 100.

According to another aspect of the present disclosure, an appliance includes a housing defining a cooking cavity with an open front portion. A door is pivotally coupled to the housing along a vertical rotational axis, and is operable between open and closed positions relative to the open front portion of the cooking cavity to selectively provide access to the cooking cavity. A hinge assembly interconnects the door and the housing and includes a first hinge element and a second hinge element. The first hinge element includes a hinge pin with upper and lower portions and an engagement portion disposed therebetween with a lower surface with at least one vertically disposed abutment surface. The second hinge element includes a body portion surrounding a hollow interior portion which slidably receives the lower portion of the hinge pin of the first hinge element. The second hinge element further includes a contoured upper rim having at least one vertically disposed abutment surface. The contoured upper rim of the second hinge element is engaged with the lower surface of the first hinge element. The first hinge element rotates relative to the second hinge element between a first position, wherein the at least one abutment surface of the first hinge element abuts the at least one abutment surface of the second hinge element, and a second position, wherein the at least one abutment surface of the first hinge element is horizontally and vertically spaced-apart from the at least one abutment surface of the second hinge element.

According to another aspect of the present concept, a mounting plate is operably coupled between the door and the first hinge element, wherein the mounting plate includes a mounting sleeve with a hollow interior portion.

According to another aspect of the present concept, the upper portion of the hinge pin is received in the hollow interior portion of the mounting sleeve.

According to another aspect of the present concept, the mounting sleeve includes a slot, and the first hinge element includes an engagement feature received in the slot to operably couple the first hinge element to the mounting plate for rotation therewith.

According to another aspect of the present concept, the at least one abutment surface of the first hinge element is positioned in a vertical position above the at least one abutment surface of the second hinge element when the first hinge element is in the second position.

According to another aspect of the present concept, the contoured upper rim of the second hinge element includes an angled portion that is downwardly angled from a first end to a second end thereof.

According to another aspect of the present concept, the at least one abutment surface of the first hinge element is positioned at the first end of the angled portion of the contoured upper rim of the second hinge element when the first hinge element is in the second position.

According to another aspect of the present concept, the at least one abutment surface of the first hinge element moves from the first end of the angled portion of the contoured upper rim of the second hinge element downwardly towards the second end of the angled portion of the contoured upper rim of the second hinge element when the first hinge element moves from the second position to the first position.

According to another aspect of the present concept, the first position of the first hinge element correlates to the open position of the door, and the second position of the first hinge element correlates to the closed position of the door.

According to another aspect of the present concept, the door is gravitationally predisposed to the open position.

According to another aspect of the present concept, the engagement between the contoured upper rim of the second hinge element and the lower surface of the first hinge element biases the door towards the open position.

According to another aspect of the present concept, a hinge assembly is configured to pivotally couple a door to an appliance. The hinge assembly includes a first hinge element having a hinge pin with upper and lower portions and an engagement portion outwardly extending from an outer surface of the hinge pin. The engagement portion includes a lower surface having an upwardly angled portion disposed adjacent to an abutment surface. A second hinge element includes a body portion surrounding a hollow interior portion, wherein the second hinge element further includes a contoured upper rim having a downwardly angled portion and an abutment surface. The lower portion of the hinge pin of the first hinge element is slideably received in the hollow interior portion of the second hinge element for vertical movement therein. The first hinge element rotates relative to the second hinge element between a first rotational position, wherein the abutment surface of the first hinge element abuts the abutment surface of the second hinge element, and a second rotational position, wherein the abutment surface of the first hinge element is spaced-apart from the abutment surface of the second hinge element.

According to another aspect of the present concept, the first hinge element is biased towards the first rotational position.

According to another aspect of the present concept, the first hinge element is positioned at a first vertical position when the first hinge element is in the first rotational position.

According to another aspect of the present concept, the first hinge element is positioned at a second vertical position that is higher than the first vertical position when the first hinge element is in the second rotational position.

According to one aspect of the present disclosure, an appliance includes a cooking cavity with an open front portion and a door operable between open and closed positions relative to the open front portion of the cooking cavity to selectively provide access to the cooking cavity. A hinge assembly includes a first hinge element operably coupled to the door for rotation therewith. The first hinge element includes an engagement portion having a lower surface and an abutment surface. The hinge assembly further includes a second hinge element having an upper rim engaged with the lower surface of the engagement portion of the first hinge element. The upper rim of the second hinge element includes an angled portion and an abutment surface. The first hinge element rotates relative to the second hinge element between a first rotational position, wherein the abutment surface of the first hinge element abuts the abutment surface of the second hinge element and the door is in the open position, and a second rotational position, wherein the abutment surface of the first hinge element is spaced-apart from the abutment surface of the second hinge element and the door is in the closed position.

According to another aspect of the present concept, the door is biased towards the open position.

According to another aspect of the present concept, the first hinge element is positioned at a first vertical position when the first hinge element is in the first rotational position.

According to another aspect of the present concept, the first hinge element is positioned at a second vertical position that is higher than the first vertical position when the first hinge element is in the second rotational position.

According to another aspect of the present concept, the abutment surface of the first hinge element moves from a first end of the angled portion of the upper rim of the second hinge element downwardly towards a second end of the angled portion of the upper rim of the second hinge element when the first hinge element moves from the second rotational position to the first rotational position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance, comprising:

a housing defining a cooking cavity with an open front portion;

a door pivotally coupled to the housing along a vertical rotational axis, wherein the door is operable between open and closed positions relative to the open front portion of the cooking cavity to selectively provide access to the cooking cavity;

a hinge assembly interconnecting the door and the housing, wherein the hinge assembly includes a first hinge element having a hinge pin with upper and lower portions and an engagement portion disposed therebetween with a lower surface having at least one abutment surface that is vertically disposed, wherein the hinge assembly further includes a second hinge element having a body portion surrounding a hollow interior portion which slidably receives the lower portion of the hinge pin of the first hinge element, wherein the second hinge element further includes a contoured upper rim having at least one abutment surface that is vertically disposed, the second hinge element further includes a base portion extending outwardly around the body portion of the second hinge element and having a flat portion, wherein the contoured upper rim of the second hinge element is engaged with the lower surface of the first hinge element, and further wherein the first hinge element rotates relative to the second hinge element between a first position, wherein the at least one abutment surface of the first hinge element abuts the at least one abutment surface of the second hinge element, and a second position, wherein the at least one abutment surface of the first hinge element is horizontally and vertically spaced-apart from the at least one abutment surface of the second hinge element;

a mounting plate operably coupled between the door and the first hinge element, the mounting plate having upper and lower apertures disposed at opposed ends of the mounting plate and opening into upper and lower hollow interior portions of the mounting plate, respectively, wherein the upper portion of the hinge pin is received in the lower hollow interior portion of the mounting plate at the lower aperture thereof; and a hinge bracket having a receiving aperture, wherein the receiving aperture includes a round outer perimeter with a flat portion, wherein the base portion of the second hinge element is received in the receiving aperture of the hinge bracket, such that the flat portion of the receiving aperture of the hinge bracket aligns with the flat portion of the base portion of the second hinge element.

2. The appliance of claim 1, wherein the at least one abutment surface of the first hinge element is positioned in a vertical position above the at least one abutment surface of the second hinge element when the first hinge element is in the second position.

3. The appliance of claim 2, wherein the contoured upper rim of the second hinge element includes an angled portion that is downwardly angled from a first end to a second end thereof.

4. The appliance of claim 3, wherein the at least one abutment surface of the first hinge element is positioned at the first end of the angled portion of the contoured upper rim of the second hinge element when the first hinge element is in the second position.

5. The appliance of claim 4, wherein the at least one abutment surface of the first hinge element moves from the first end of the angled portion of the contoured upper rim of the second hinge element downwardly towards the second end of the angled portion of the contoured upper rim of the second hinge element when the first hinge element moves from the second position to the first position.

6. The appliance of claim 5, wherein the first position of the first hinge element correlates to the open position of the door, and further wherein the second position of the first hinge element correlates to the closed position of the door.

7. The appliance of claim 6, wherein the door is gravitationally predisposed to the open position.

8. The appliance of claim 1, wherein the engagement between the contoured upper rim of the second hinge element and the lower surface of the first hinge element biases the door towards the open position.

9. A hinge assembly for pivotally coupling a door to an appliance, the hinge assembly comprising:

a first hinge element having a hinge pin with upper and lower portions and an engagement portion outwardly extending from an outer surface of the hinge pin, wherein the engagement portion includes a lower surface having an upwardly angled portion, an abutment surface, and a flat portion disposed between the upwardly angled portion and the abutment surface;

a second hinge element having a body portion surrounding a hollow interior portion, wherein the second hinge element further includes a contoured upper rim having a downwardly angled portion and an abutment surface, wherein the second hinge element further includes a base portion extending outwardly around the body portion of the second hinge element and having a flat portion, wherein the second hinge element further includes a head portion extending outwardly from the base portion of the second hinge element, wherein the lower portion of the hinge pin of the first hinge element is slideably received in the hollow interior portion of the second hinge element for vertical movement therein, and further wherein the first hinge element rotates relative to the second hinge element between a first rotational position, wherein the abutment surface of the first hinge element abuts the abutment surface of the second hinge element, and a second rotational position, wherein the abutment surface of the first hinge element is spaced-apart from the abutment surface of the second hinge element;

a hinge bracket having a receiving aperture, wherein the receiving aperture includes a flat portion, wherein the base portion of the second hinge element is received in the receiving aperture of the hinge bracket, such that the flat portion of the receiving aperture of the hinge bracket aligns with the flat portion of the base portion of the second hinge element, such that the second hinge element is rotationally fixed with respect to the hinge bracket, and further wherein the head portion of the second hinge element abuts a lower surface of the hinge bracket; and a mounting plate having upper and lower hollow interior portions that are spaced-apart from one another, wherein the upper portion of the hinge pin is received in the lower hollow interior portion of the mounting plate at the lower aperture thereof.

10. The hinge assembly of claim 9, wherein the first hinge element is biased towards the first rotational position.

11. The hinge assembly of claim 9, wherein the first hinge element is positioned at a first vertical position when the first hinge element is in the first rotational position.

12. The hinge assembly of claim 11, wherein the first hinge element is positioned at a second vertical position that is higher than the first vertical position when the first hinge element is in the second rotational position.

* * * * *